2,712,014
Patented June 28, 1955

2,712,014

DERIVATIVES OF NICOTINIC ACID AMIDES

Hans Suter, Dorflingen, and Ernst Habicht and Werner Kündig, Schaffhausen, Switzerland, assignors to Cilag Limited, Schaffhausen, Switzerland, a Swiss company No Drawing. Application February 28, 1952,
Serial No. 274,048

Claims priority, application Switzerland March 1, 1951

12 Claims. (Cl. 260—247.2)

This invention relates to new derivatives of nicotinic acid amides of the general formula

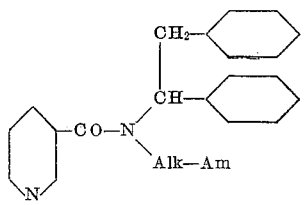

as well as their acid and quaternary salts, whereby in the formula Alk represents an alkylene radical containing from 2 to 4 carbon atoms, Am represents a low molecular dialkylamino radical, a N-piperidino or a N-morpholino radical.

It was found that these nicotinic acid amides are pharmacologically effective, for instance, spasmolytically. The quaternary salts have a parasympatholytical effect. The salts of our new substituted nicotinic acid amides with inorganic and organic acids are generally readily soluble in water. As a rule, such solutions are of neutral reaction so that they can be applied parenterally.

The nicotinic acid amides according to our invention may be produced in different ways. First, it is possible to react a base of the formula

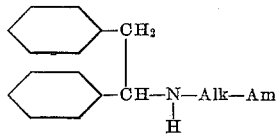

in which Alk and Am correspond to the above indicated definitions, with a reactive compound which contains the nicotinic acid radical, for instance nicotinic acid itself, a nicotinylhalide, the anhydride or a lower alkyl ester of nicotinic acid. In certain cases the preparation may be carried out, as already known, in the presence of acid binding agents or an excess of the base of the formula II.

According to another method of our invention, nicotinic acid-(1,2-diphenylethyl)amide is reacted with an aminoalkyl halide of the formula

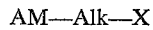
AM—Alk—X wherein X is a halogen and Am and Alk have the meaning given above, in the presence of an acid binding agent. Sodium amide, lithium amide, sodium and potassium are suitable acid binding agents. As reactive aminoalkyl halides of the formula

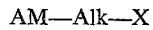
AM—Alk—X

We mention dimethylamino ethyl chloride, diethylamino ethyl chloride, piperidino ethyl chloride, morpholino ethyl chloride, β-dimethylamino propyl chloride, and β-diethylamino propyl chloride.

By reacting compounds of formula I with reactive esters of alcohols or aralkanols, for instance, alkyl-or aralkylhalides, alkyl- or aralkylsulfates, alkylsulfonates, in a molar proportion, quaternary salts of our nicotinic acid amides are obtained. Thereby the N-atom of the side chain is preferably quaternized.

When an amide of the formula I is reacted with an excess of a quaternizing agent, the N-atom of the side chain and of the nicotinic acid ring will be quaternized. These diquaternary salts are also easily soluble in water, but do not possess the same stability against alkali as the monoquaternary salts. Our nicotinic acid amides form water-soluble salts with inorganic or organic acids, such as hydrochloric acid, hydrobromic acid, sulphuric acid, acetic acid, methane sulfonic acid, citric acid, etc.

The following examples illustrate the invention:

Example 1

160 gms. of N-(2'-diethylaminoethyl)-N-(1,2-diphenylethyl)-amine and 195 gms. of nicotinic acid anhydride are dissolved in 2 l. of warm benzene, 117 gms. of freshly calcined potassium carbonate are added and the whole is boiled for 5 hours. After cooling, the whole is stirred with diluted sodium hydroxide solution several times, the benzene solution is then extracted with diluted hydrochloricacid, the aqueous acid solution filtrated and made alkaline with caustic soda solution. The oil swimming on the surface is then taken up in chloroform. After evaporation of the chloroform, the residue is recrystallized from petroleum ether. In this way 137 gms. of nicotinic acid [N - (1,2 - diphenylethyl) - N - (2' - diethylaminoethyl)] amide, i. e. 63% of the theory, are obtained. The new substituted nicotinic acid amide melts at 89–91° and is readily soluble in diluted mineral acids, less readily soluble in water and petroleum ether. The hydrochloride of the compound melts at 185–186° and is soluble in cold water at about 5%.

Example 2

The compound obtained according to Example 1 may also be obtained in the following manner: 50 gms. of nicotinic acid-(1,2 - diphenylethyl) - amide are refluxed with 9 gms. of sodium amide and 24.8 gms. of dimethylamino ethyl chloride in 400 cc. of abs. benzene. After cooling, water is added drop by drop in order to destroy the excessive sodium amide and the whole is extracted with 2 n acetic acid. The extract of the acetic acid is made alkaline, the separating oil is taken up in benzene and the benzene is evaporated. After some time, the residue crystallizes, constituting nicotinic acid-[N-(1,2 - diphenylethyl)-N-(2'-diethylaminoethyl)]-amide. By dissolving the base in hot hydrochloric acid and cooling, 45 gms. of the pure hydrochloride are obtained, i. e. 62% of the theory. By evaporation of the acid benzene solution, an average of 12 gms., i. e. 25% of nicotinic acid-(1,2-diphenylethyl)-amide may be regained.

Example 3

15.1 gms. of nicotinic acid-(1,2-diphenylethyl)-amide, 2.3 gms. of sodium amide and 8.3 gms. of freshly distilled β-morpholino ethyl chloride are boiled in 150 cc. of abs. benzene for 7 hours. The whole is handled in the usual manner whereupon a viscous oil is obtained which represents nicotinic acid - [N-(1,2-diphenylethyl) - N-(2'-morpholinoethyl)]-amide. It is easily soluble in organic solvents as well as in diluted mineral acids. The chloroplatinate melts at 185–188° with decomposition.

Example 4

30 gms. of N-(1,2-diphenylethyl) - N - (2'-piperidinoethyl)-amine of a boiling point of 142°–143°/0.01 mm., are boiled for 5 hours in 500 cc. of benzene with 21 gms. of potassium carbonate and 35 gms. of nicotinic acid anhydride. The whole is again handled in the usual manner and 32 gms. of nicotinic acid-[N-(1,2-diphenylethyl)-

N-(2'-piperidinoethyl)]-amide are obtained, which represents a slightly yellowish colored oil, very readily soluble in organic solvents as well as in diluted mineral acids.

*Example 5*

10 gms. of nicotinic acid-[N-(1,2 - diphenylethyl) - N-(2'-diethylaminoethyl)]-amide are stirred for 26 hours with 3.34 gms. of methane sulfonic acid methyl ester in 100 cc. of acetic acid methyl ester at a temperature of 45–50°. After cooling, 250 cc. of abs. ether are added whereby the quaternary salt is precipitating smearily. The solvent is poured off and the residue digested with abs. ether several times. The crumbly mass is sucked off, dissolved in abs. chloroform and precipitated with abs. ether. In this way, 5.6 gms. of nicotinic acid-[N-(1,2-diphenylethyl) - N-(2'-diethylaminoethyl)]-amide methyl methane sulfonate are obtained, which melts at 82° with decomposition. The quaternary salt thus obtained is very readily soluble in water with practically neutral reaction.

*Example 6*

In a similar manner as described in the aforementioned example, the iodo methylate of the nicotinic acid-[N-(1,2-diphenylethyl)-N - (2'-diethylaminoethyl)]-amide is obtained, which melts at 121–123° and which is also fairly readily soluble in water.

*Example 7*

If nicotinic acid [N-(1,2-diphenylethyl)-N-(2'-piperidinoethyl)]-amide is dissolved in acetic acid methyl ester and 8–10 times of the molar quantity methyl iodide is added, the di metho iodide is obtained, which melts at 160 to 162° and forms a slightly yellowish colored crystalline powder which can be recrystallized from methanol acetic acid methyl ester.

What we claim is:

1. A compound selected from the group consisting of a nicotinic acid amide, its acid addition salts, and its quaternary salts, said amide having the formula

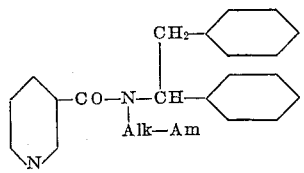

in which Alk represents an alkylene radical containing from 2 to 4 carbon atoms, Am represents a member selected from the group consisting of a low molecular dialkylamino radical, the N-piperidino, and the N-morpholino radical.

2. The new chemical compound of the formula

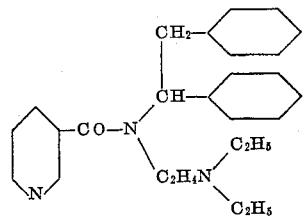

3. The new chemical compound of the formula

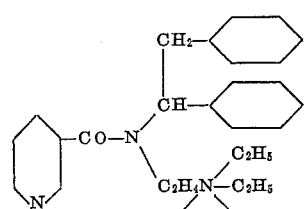

4. The new chemical compound of the formula

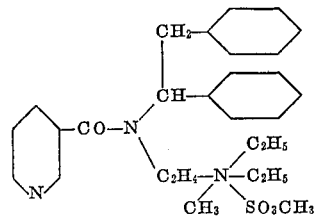

5. The new chemical compound of the formula

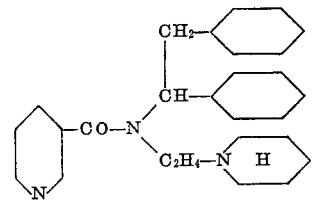

6. The new chemical compound of the formula

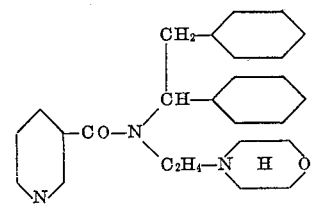

7. The process for the production of new nicotinic acid amides of the general formula

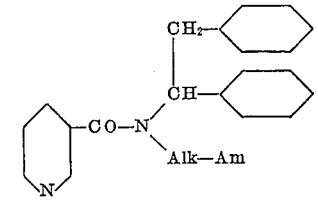

in which Alk represents an alkylene radical containing from 2 to 4 carbon atoms, Am represents a member selected from the group consisting of a low molecular dialkylamino radical, the N-piperidino, and the N-morpholino radical, which comprises reacting a base of the general formula

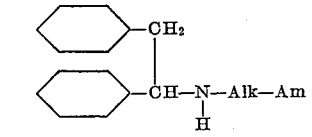

in which Alk and Am have the above mentioned meaning, with a reactive compound selected from the group consisting of nicotinic acid, its anhydride and a nicotinylhalide, in the presence of an acid binding agent.

8. The process according to claim 7, which comprises heating N-(1,2-diphenylethyl)-N-(2'-diethylaminoethyl)-amine with nicotinic acid anhydride in the presence of potassium carbonate whereupon nicotinic acid-[N-(1,2-diphenylethyl)-N-(2'-diethylaminoethyl)]-amide is obtained.

9. The process according to claim 7, which comprises heating N - (1,2 - diphenylethyl) - N - (2' - piperidinoethyl)amine with nicotinic acid anhydride in the presence of potassium carbonate whereupon the nicotinic acid-[N-(1,2-diphenylethyl)-N-(2'-piperidinoethyl)]amide is obtained.

10. The process for the production of new nicotinic acid amides, which comprises reacting nicotinic acid-(1,2-diphenylethyl)-amide with an aminoalkyl halide of the formula Am—Alk—X in which Alk represents an alkylene radical containing from 2 to 4 carbon atoms, Am represents a member selected from the group consisting of a low molecular dialkylamino radical, the N-piperidino, and the N-morpholino radical, and X represents a halogen in the presence of an alkali amide as condensation medium.

11. The process according to claim 10, which comprises heating nicotinic acid-(1,2-diphenylethyl)-amide with diethylamino ethyl chloride and sodium amide, whereupon nicotinic acid-[N-(1,2-diphenylethyl)-N-(2'-diethylaminoethyl)]-amide is obtained.

12. The process according to claim 10, which comprises heating nicotinic acid-(1,2-diphenylethyl)-amide with morpholino ethyl chloride and sodium amide, whereupon nicotinic acid-[N-(1,2-diphenylethyl)-N-(2'-morpholinoethyl)]-amide is obtained.

References Cited in the file of this patent
UNITED STATES PATENTS

| | | |
|---|---|---|
| 2,274,620 | Szabo | Feb. 24, 1942 |
| 2,483,250 | Suter | Sept. 27, 1948 |

OTHER REFERENCES

Sperber et al., J. A. Chem. Soc., vol. 72, pp. 2724–7 (1950).